United States Patent
Modave

(10) Patent No.: US 7,496,738 B2
(45) Date of Patent: Feb. 24, 2009

(54) METHOD OF AUTOMATIC CONTROL OF THE EXECUTION OF A PROGRAM BY A MICROPROCESSOR

(75) Inventor: Jean-Louis Modave, Ottignies (BE)

(73) Assignee: Proton World International N.V., Zaventem (BG)

(*) Notice: Subject to any disclaimer, the term of this patent is extended or adjusted under 35 U.S.C. 154(b) by 88 days.

(21) Appl. No.: 11/146,719

(22) Filed: Jun. 7, 2005

(65) Prior Publication Data

US 2005/0289270 A1    Dec. 29, 2005

(30) Foreign Application Priority Data

Jun. 7, 2004  (FR) .................................. 04 51122

(51) Int. Cl.
  *G06F 7/38* (2006.01)
(52) U.S. Cl. ...................................... 712/227; 714/809
(58) Field of Classification Search ................. 712/227; 714/809
  See application file for complete search history.

(56) References Cited

U.S. PATENT DOCUMENTS 3,704,363 A * 11/1972 Salmassy et al. ............ 714/704

2001/0010331 A1   8/2001  Hazard
2005/0033943 A1   2/2005  Weiss

OTHER PUBLICATIONS

French Search Report from French Patent Application No. 04/51122, filed Jun. 7, 2004.

* cited by examiner

*Primary Examiner*—Eddie P Chan
*Assistant Examiner*—John Lindlof
(74) *Attorney, Agent, or Firm*—Lisa K. Jorgenson; James H. Morris; Wolf, Greenfield & Sacks, P.C.

(57) ABSTRACT

A method and a circuit of automatic control of the execution of a program by a microprocessor, including: assigning a digital decrement or increment to at least one function of the program; assigning a digital increment, respectively decrement, to at least one section considered as critical as to the program execution and called by the function; setting a counter to a first value; decrementing, respectively incrementing, the counter once per function before a call to a critical section; incrementing, respectively decrementing, the counter on each correct execution of a section; and comparing the current value of the counter with a predetermined critical threshold.

12 Claims, 2 Drawing Sheets

METHOD OF AUTOMATIC CONTROL OF THE EXECUTION OF A PROGRAM BY A MICROPROCESSOR

BACKGROUND OF THE INVENTION

1. Field of the Invention

The present invention generally relates to the execution of programs (software codes) by an integrated microprocessor. The present invention more specifically relates to the control of the integrity of a program during its execution, to check that it is executed with a normal sequencing, that the program has not been voluntarily or incidentally modified since its installation, be it prior to its execution or during said execution. Such modifications may result from computer viruses or piracy attempts including, more specifically, injecting faults in the program execution.

2. Discussion of the Related Art

A so-called trap fault injection attack may include the introduction of a disturbance on the processor power supply for a short time. Such an attack may cause an unexpected jump in the program execution sequence. An example of application is the case of a processor that must decide whether a specific operation is allowed (for example, in the case of credit cards, the authorization of a bank transaction after authentication of the user).

Such types of attacks affecting, for example, the execution of a cryptography algorithm may include having the program counter jump to cause an unexpected jump in the execution sequence by any means, even if the program has not stopped or is in a loop upon authentication. For example, for cryptography algorithms (DSA, RSA, DES, AES, etc.), the secret keys can be discovered by a piracy causing instruction jumps.

According to another aspect, the pirate attempts to modify the program sequencing on execution thereof. In the case of a smart card, this sometimes amounts to modifying the order of commands received by the card processor, sometimes inserting abnormal commands in sessions of communication with the card. The pirate's aim then not necessarily is to discover a secret, but to divert the application executed by the card, for example, to fraudulently extend a utilization period managed by the card (a transportation ticket, for example).

According to the application, the program to be protected is contained in a ROM written into upon manufacturing and not modifiable or in a rewritable non-volatile memory, for example, a flash memory.

To protect the software code upon execution thereof, a periodic checking of this code is generally provided based on an authentication key stored in a memory or in the integrated circuit, for example, upon initial storage of the program or installation thereof. For example, a signature (application of an encryption algorithm to at least a portion of the software code) is calculated upon installation or writing of the program. This signature is then stored in or outside of the integrated circuit executing the program. Then, upon execution of the software code, the operating system recalculates a signature based on the same algorithm as that used for the generation of the initial signature. The current signature is then compared with the predetermined signature. A divergence between the two signatures means that the stored program has been modified and thus enables identifying a potential unwanted or incidental attack. An example of such an integrity check method is described in U.S. Pat. No. 5,442,645, which is incorporated herein by reference.

A disadvantage of known solutions with signatures is that, in case of an updating of the software code by a more recent version (case where the program is in a rewritable memory), it is then necessary to update the predetermined signature. Such an updating may be penalizing especially in case of a frequent updating of the system. Further, the updatings of programs occur more and more often via communication networks of Internet type. It is then not desirable to multiply signature calculations to be rerecorded in the integrated circuit on the user side.

Another disadvantage of conventional solutions with signatures is that the integrity check is static, that is, at the beginning of the program, it is checked whether the signature is actually allowed. Accordingly, such a protection system is in practice inefficient in case of a fault injection during execution of the program.

Another known solution to control the execution of a program is to perform certain operations twice, to have a redundancy on the data to check the coherence between the two executions.

A common disadvantage of the above-discussed known techniques is that they are greedy in calculation resources. Accordingly, they are poorly adapted to low-power integrated microcontrollers, as for example those available in smart cards.

An additional technical problem which is posed in the control of the execution of a program is that a same section of the program (for example, a writing of a number into the non-volatile memory) may be more or less critical according to the sections which have been previously executed by this program. In other words, the same operation performed by a microcontroller must or not be considered as a piracy attempt according to the place where it is located in the program execution. For example, the checking (request of entry by the card reader) of a secret code several times consecutively in a smart card, without for this checking to come along with an operation (debit, balance checking, etc.) between the checkings, is suspectable. The same code checking is however normal if it is followed by a processing operation conditioned by this checking.

This problem is not solved by known program execution control techniques.

SUMMARY OF THE INVENTION

The present invention aims at overcoming the disadvantages of known program execution solutions and, more specifically, at enabling dynamic checking, that is, a checking which detects the errors in the sequencing of a program, whether they come or not from fault injections on execution thereof.

The present invention also aims at providing a solution which takes into account the more or less critical character of an operation according to the operations which have come before it.

The present invention also aims at providing a solution which does not require a signature updating on each updating of the software code to be protected.

The present invention also aims at providing a solution which is compatible with an execution on a smart card type power microcontroller of limited power.

The present invention further aims at providing a solution which is compatible with a restarting of the microcontroller after a blocking resulting from a fault in the program execution.

To achieve these and other objects, the present invention provides a method of automatic control of the execution of a program by a microprocessor, comprising:

assigning a digital decrement or increment to at least one function of the program;

assigning a digital increment, respectively decrement, to at least one section considered as critical as to the program execution and called by the function;

setting a counter to a first value;

decreasing, respectively increasing, the counter once per program function before a call to a critical section, by a value which is a function of the decrement, respectively increment, assigned to the concerned program function;

increasing, respectively decreasing, the counter on each correct execution of a section, by a value which is a function of the increment, respectively decrement, assigned to the concerned section; and comparing the current value of the counter with a predetermined critical threshold.

According to an embodiment of the present invention, the comparison with the critical threshold is performed at each end of a function.

According to an embodiment of the present invention, an error processing is implemented when the current value becomes smaller, respectively greater, than the critical threshold, said processing resulting, preferably, in a blocking of the microprocessor.

According to an embodiment of the present invention, the increase, respectively decrease, of the counter on each correct execution of a section is limited by a second value.

According to an embodiment of the present invention, the first set value of the counter is randomly selected between two terminals.

According to an embodiment of the present invention, the second value is randomly selected between two limits relatively high with respect to the two limits of the first value.

According to an embodiment of the present invention, the increase, respectively the decrease, of the counter occurs at each beginning of a function.

According to an embodiment of the present invention, the increase, respectively the decrease, of the counter occurs at each end of a section.

According to an embodiment of the present invention, the increase, respectively the decrease, of the counter before a critical section call, is zero.

According to an embodiment of the present invention, the respective increment and decrement values are selected according to their critical character as to the program execution.

According to an embodiment of the present invention, the steps of increasing and decreasing the counter comprise incrementing, respectively decrementing, the counter.

The present invention also provides a microcontroller comprising at least one microprocessor, a rewritable non-volatile memory, a non-volatile memory, rewritable or not, for storing at least one program to be executed, and a RAM, comprising means for executing the control method.

The present invention also provides a smart card comprising such a microcontroller.

The foregoing objects, features, and advantages of the present invention, as well as others, will be discussed in detail in the following non-limiting description of specific embodiments in connection with the accompanying drawings.

DETAILED DESCRIPTION

The same elements have been designated with the same references in the different drawings. For clarity, only those elements and steps which are necessary to the understanding of the present invention have been shown and will be described hereafter. In particular, the operators or instructions concerned by the implementation of the present invention have not been described in detail. The present invention applies whatever the type of operator or instruction. Further, all the components necessary to the execution of a program, be it for a software implementation of by means of a wired logic state machine, have not been detailed, their forming using conventional elements.

Figure 1:
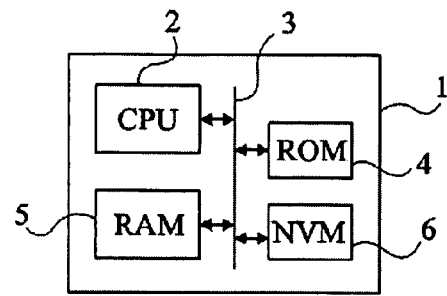
FIG. 1 very schematically shows in the form of blocks an example of a microcontroller to which the present invention more specifically applies.

FIG. 1 very schematically shows in the form of blocks a simplified embodiment of a microcontroller 1 of smart card type to which the present invention more specifically applies. Such a microcontroller 1 comprises a central processing unit 2 (CPU) communicating via a bus 3 with different memories, among which at least one memory 4 (for example, a ROM or a flash memory) for storing programs to be executed, a RAM 5 used during execution of the programs, and a rewritable non-volatile memory (NVM) 6. Chip 1 also comprises inputs/outputs (not shown) towards the outside, be it in the form of contacts or of a communication antenna.

The present invention will be described hereafter in relation with an example of application to smart cards. It should however be noted that it more generally applies to any electronic component containing a program execution microcontroller, be the memories integrated or not with the microprocessor.

A feature of the present invention is to divide the program into functions preferably implementing several sections, and assigning, to each function and/or section of a program considered as critical, a higher or lower value according to whether the section and/or function is considered as more or less critical in terms of security.

According to a preferred embodiment of the present invention, a totalization counter is decremented (or incremented) by a predetermined value at each beginning of a function and is incremented (respectively, decremented), progressively, by the values assigned to the different sections called by this function. This amounts to assigning a different number of points to the execution of a section according to the command or function within which it is executed. Periodically, for example, at each end of a function, the totalization counter is compared with a critical threshold (for example, 1 in the case of a decrement for each function) which enables, if it is reached, detecting a problem in the program execution. This amounts to establishing a program execution confidence threshold which is adapted according to the commands executed by said program.

A second threshold is preferably used as a maximum threshold to avoid for the totalization count to become too high.

For simplification, the present invention will be described by considered an increment assigned to sections and a decrement assigned to functions. All that will be described hereafter easily transposes (decrement assigned to sections and increment assigned to functions).

In a simplified embodiment, a counter is only incremented each time a section is properly executed, the increment value being a function of the position of the section in the program (of the function during which it is executed). This amounts to assigning a zero decrement to functions.

The implementation of the present invention requires a preparatory step on design of the program which is to assign, to the different commands (functions) and sections, increment and decrement values to provide acceptable variations in the case of a normal execution of the program and variations detectable in case of an abnormal execution. The determination of such increments and decrements will appear to be within the abilities of those skilled in the art once the following simplified examples of the present invention have been discussed.

Figure 2:
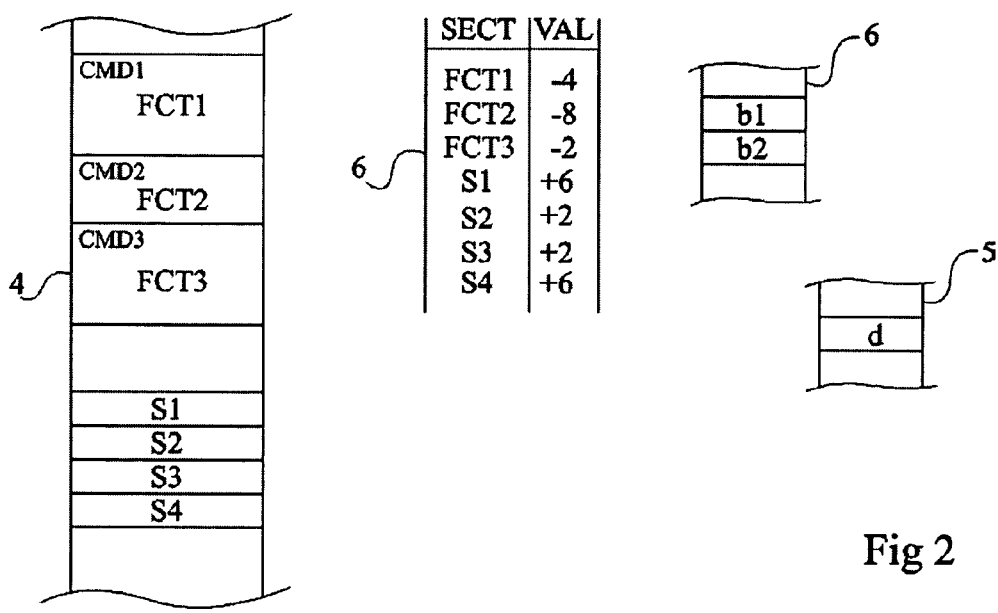
FIG. 2 illustrates an embodiment of the method of the present invention by an example of the content of a memory of the controller of FIG. 1.

FIG. 2 illustrates, in a simplified view of arbitrary contents of memories of the card of FIG. 1, an example of embodiment of the present invention.

It is assumed that a program present in ROM 4 comprises three sections FCT1, FCT2, and FCT3, each called by three different commands CMD1, CMD2, and CMD3. It is also assumed that the program contains four functions or sub-programs S1, S2, S3, and S4. Other sections or functions may be present in the program without for all this to be considered as critical from the point of view of security according to the present invention. In other words, it is not necessary for all commands or sections to be monitored by the present invention.

In the preparatory step, decrements, respectively increments, are assigned to each of the functions and sections. These values are stored, for example, in non-volatile memory 6 on installation of the program. As an alternative, they are themselves contained in memory 4, for example, being directly in the program in the form of decrement or increment instruction lines added to the lines of the functions and sections. The different values assigned to the same section then are, for example, contained in a line of the section.

In the example of FIG. 2, respective decrements −4, −8, and −2 are assigned to functions FCT1, FCT2, and FCT3 while respective increments +6, +2, +2, and +6 are assigned to sections S1, S2, S3, and S4. The use of these increments and decrements will be better understood hereafter in relation with the discussion of FIGS. 3 and 4.

According to the present invention, a first number b1 corresponding to an a priori confidence level is stored in non-volatile memory 6 or in ROM 4. Number b1 is used to initialize the totalization counter representing instantaneous or dynamic confidence level d which is updated, for example, by being contained in memory 5 (RAM) on each program execution. Preferably, instantaneous confidence level d is stored in non-volatile memory 6. This enables implementing the checking method over several card use sessions.

In the embodiment which will be described hereafter, instantaneous number d is assumed to be initialized at value b1 on each powering-on of the card, which amounts to a storage of number d in the RAM.

A second threshold b2 is also stored in a non-volatile memory (for example, in memory 4 or 6) and represents the maximum confidence limit, that is, the number that counter d must not exceed on execution of the program.

According to a preferred embodiment of the present invention, the two numbers b1 and b2 are randomly drawn at the beginning of the card lifetime (for example, in a step of personalization by installation of the secret keys). To respect the operation of the present invention, number b1 is drawn between two relatively low limits (for example, b1 ranges between 4 and 8) while number b2 is drawn between two higher limits (for example, number b2 ranges between 16 and 64). The limits of the random drawing are selected according to the developments expected for number d on normal program execution. Such an embodiment enables the thresholds contained in two different cards to be different from each other while remaining compatible with a non-exceeding of the critical threshold in case of a normal program execution. This thus enables making the reproduction of a possible attack from one card to another impossible since, as will be seen hereafter, both cards will then block at different program execution phases.

Figure 3:
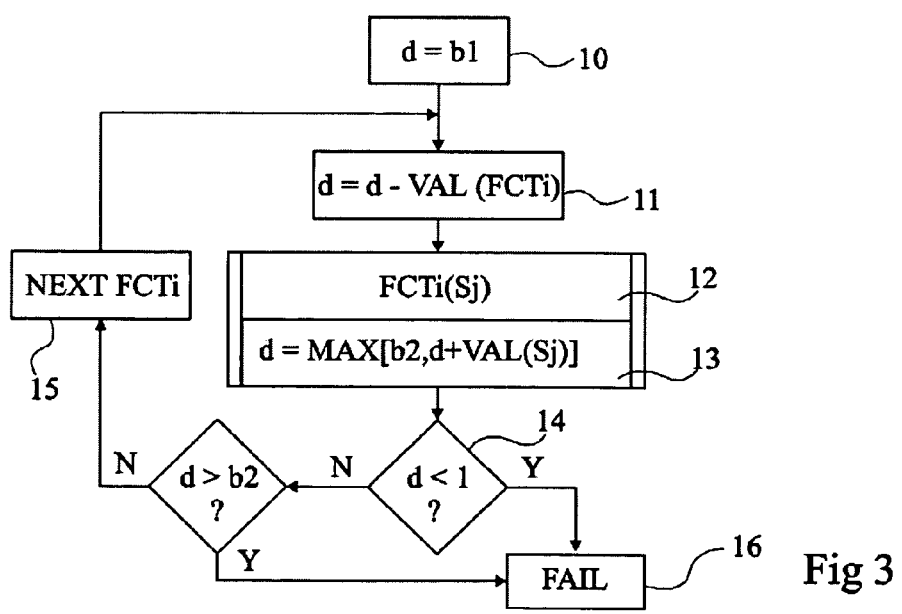
FIG. 3 is a simplified flowchart of an embodiment of the method of the present invention.

FIG. 3 illustrates, in a simplified flowchart, a simplified implementation mode of the execution command method according to the present invention.

At the beginning of the execution of a program, for example, on powering-on of the smart card, count d is initialized at value b1 (block 10, d=b1). According to a preferred implementation mode, counter d is initialized at value b1 once and for all (for example, after the random drawing of value b1).

Then, at each beginning of the execution of a function to be monitored, that is, on each occurrence of an initial command $CMD_i$ of a function $FCT_i$, count d is decremented by the value assigned to this function (block 11, d=d−VAL($FCT_i$)). Function $FCT_i$ of the program then is executed (block 12, $FCT_i$ ($S_j$)) by implementing, when necessary, one or several sections $S_j$.

At each end of a section $S_j$, count d is incremented by the value of this correctly-executed section (block 13, d=MAX [b2,d+VAL($S_j$)]), by being limited by value b2. "Correct execution" means, according to the present invention, the execution of a section until completion thereof. As an alternative, the increment occurs during execution of the section, once the phase (the instructions) considered as critical is passed. In fact, what matters is that the increment only intervenes on correct execution of the section. Reference will be made hereafter to the end of the execution as a preferred example, but all that will be described easily transposes to an increment at another location in the section. The same is valid for the decrement at the function beginning. This may be a specific instruction line as the function is called, but more generally, what matters is for the decrement to occur before the call of a first critical section.

As an alternative, any decreasing function may be implemented for functions $FCT_i$ and any increasing function may be implemented for sections $S_j$. For example, for functions $FCT_i$ (block 11), calculation function: d=MIN[d; d−VAL($FCT_i$)], where MIN designates the smaller of the two values in brackets may be used.

At the end of the execution of function $FCT_i$, generally detected by the occurrence of an information input-output instruction I/O, count value d is compared (block 14, d<1?) with a predetermined critical threshold. The simplest one is unity, that is, count d must always remain greater than or equal to 1 (positive) to consider the execution as correct. As an alternative, another critical threshold will be provided.

If count d has an acceptable value, the program execution carries on, in a first implementation mode, by the call of the next function (block 15, NEXT $FCT_i$). It is then returned to block 11 of decrement of count d by the value assigned to this function. If however, count d becomes negative or zero, the program then starts an error procedure (block 16, FAIL). In practice, in the case of a smart card, such a procedure comprises muting the card (MUTE mode). However, any other conventional procedure implemented in case of an error detection in the execution of a program may be used.

In the illustrated embodiment, at negative output N of test 14, it is checked (block 17, d>b2) whether second threshold b2 has not been exceeded before passing on to the next function (block 15). Such an optional checking enables detecting a possible disturbance of the operation having occurred once function $FCT_i$ is ended.

After the error procedure, several actions may be taken, especially for the smart card. According to a first example, the card is definitively blocked. As an alternative, a reset is allowed. In this case, set value b1 of the counter is preferably small. For example, on each reset due to a muting, level b1 is divided by 2. The number of possible resets is thus limited, without for all this to exclude them.

According to an alternative implementation, the counter increment on execution of a function is not performed at the end of a function, but rather step-by-step during execution thereof. In fact, this alternative amounts to dividing the function into several functions and decrementing the counter on each correct execution of a subdivision.

According to another preferred alternative, applied to the case where count d is stored in the non-volatile memory, it is further checked at each beginning of an execution that the count effectively is in the acceptable range of values. If not, it is immediately switched to the error mode and the program is not executed. Such a checking may also be performed during execution of the program.

Figure 4:
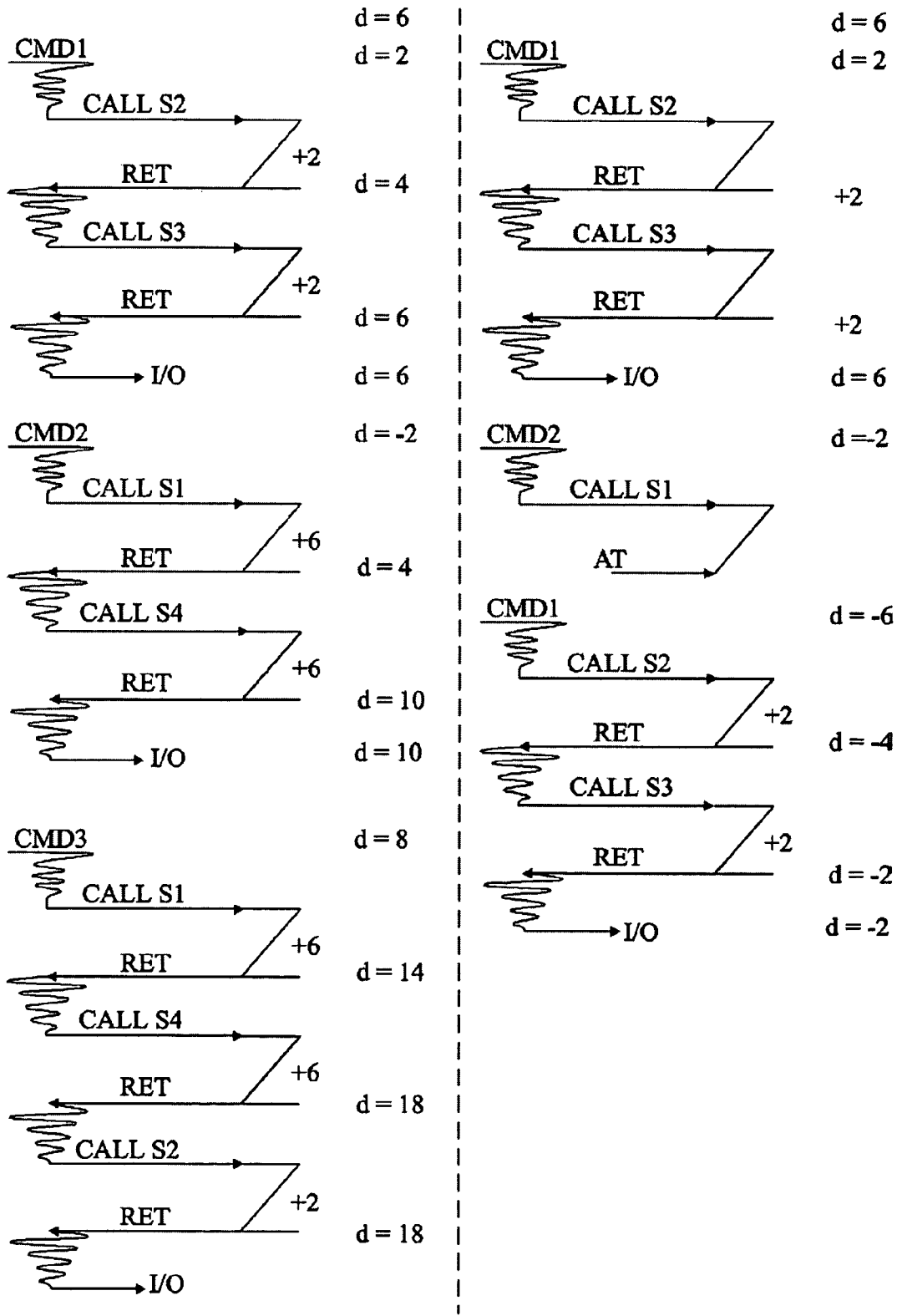
FIG. 4 illustrates the operation of the method of the present invention in the example of FIG. 2.

FIG. 4 illustrates an example of implementation of the method of the present invention such as discussed in FIG. 3, using the examples of decrements and increments of FIG. 2. The left-hand portion of FIG. 4 illustrates a normal execution of the program while its right-hand portion illustrates a faulty execution due to the occurrence of an attack during the execution of a section.

In the example of FIG. 4, it is assumed that value b1 is 6 and that threshold b2 is equal to 18. Count d accordingly is set to 6 at the beginning of the execution.

For example, the first executed function is function 1. Upon occurrence of command CMD1, count d is then decremented by 4 and thus takes value 2. The different instructions of function 1 develop and the occurrence of a call to section 2 is assumed (CALL S2). Once this section is over, its increment (+2) is accounted for, for example, on occurrence of instruction RET of return to the function. It is assumed that other non-specifically monitored instructions carry on in the function until occurrence of a call to section 3 (CALL S3) which executes normally, causing an increment by 2. At the end of command 1, detected by an instruction I/O of provision of information to the outside, count d thus has a value 6. This value is tested (block 14, FIG. 3) and since it is greater than zero, the program execution carries on.

It is assumed that function 2 is the critical function occurring consequently in the program execution. Accordingly, on occurrence of command CMD2, count d is decremented by 8 and thus takes value −2. It should be noted that other instructions may intervene between functions 1 and 2 without modifying count d if they are considered an insignificant from the point of view of security. Function 2 successively calls sections 1 and 4 (CALL S1, CALL S4) which, by being correctly executed, increments count d, twice by value 6. This results, at the end of function 2, in a count d having value 10.

It is assumed that the next executed function is function 3 in which sections 1, 4, and 2 are successively called. Upon occurrence of command instruction CMD3, count d switches to value 8 (decrement by 2). After the execution of section 1, it takes value 14. Section 4 is then executed, which should give value 20 to counter d. However, since maximum threshold b2 has been set to value 18, count d remains at value 18. The same occurs at the end of section 2 where the +2 increment cannot be assigned to counter d. Said counter thus ends the execution with this maximum value. It should be noted that it is not necessary for count d to have reached the maximum value at the end of the program execution. What matters is that it remains between the critical threshold (1) and the maximum value (18).

The calls to sections 1 and 4 in functions 2 and 3 illustrate that a different weight may be assigned to the same sections according to the locations where they occur in the program. Indeed, the execution of sections 1 and 4 within the framework of command 2 results in incrementing the counter by a total value of 4 (decrement by 8 by the function setting, followed by an increment by 12 by the proper execution of the two sections). In the framework of function 3, the command setting resulting in a decrement by 2, the execution of sections 1 and 4 results in a global increment by 10. This amounts to saying that sections 1 and 4 (for example, updating of the totalization count of an electronic purse) are considered as being less critical when they are executed within the framework of command 3 (which follows, for example, a reading of this totalization count) than when they are executed within the framework of command 2 (for example, an updating of the balance by recharging of the electronic purse).

In the right-hand portion of FIG. 4, the same development of the program has been shown, assuming an attack on execution of section 1 in function 2. This attack has been symbolized by an arrow AT interrupting the execution of the section. Count d which has been decremented at the beginning of the command has thus not been incremented by the values of sections 1 and 4 in function 2.

Assuming that this attack is part of a piracy attempt including interrupting the program execution still at the same location (for example, within a loop of a specific cryptography algorithm), the program is reexecuted from command 1 on, but without for count d to have been reset. Accordingly, the second execution of command 1 assumed to be normal enables count d to acquire twice 2 points by execution of sections 2 and 3, by having initially been decremented by 4 by the call to function 1. At the end of the second execution of function 1, count d has a value −2 and the card is muted.

Even if the present invention does not enable immediately blocking the pirate at the first attack as illustrated in FIG. 4 (for example, if count d is sufficiently high before the attack), it always ends by being blocked if the program is not executed until completion thereof.

An advantage of the present invention is that it enables dynamically detecting a fault (voluntary or incidental) in the execution of a program. Another advantage of the present invention is that its implementation requires but little resources. Indeed, it is enough to have a correspondence table of the increments-decrements assigned to the different functions and sections (this table may even be omitted if the increments-decrements are directly written into the program), and three storage spaces for respective values b1, b2, and d (plus a fourth one if count d is compared with a critical threshold different from one).

Another advantage of the present invention is that in case of a modification of the program (update, download), it is enough to also update the table of the increments-decrements if necessary for the present invention to keep on operating correctly. In the case where the increments-decrements are directly in the program, it is even simpler, they automatically replace the old values. It should be noted that this updating is optional, especially if the program modifications do not lead to the addition of new critical sections or functions.

Another advantage of the present invention in its preferred embodiment is that a piracy attempt executed on a batch of cards is thwarted by confidence levels b1 and b2 different from one card to the other.

The identification of the critical functions or sections of a program to be monitored may be performed empirically or statically by test program executions. The "right" control sequences are selected to have a tendency to increase count d representing the instantaneous confidence level while "wrong" control sequences must have a tendency to decrease this instantaneous confidence level.

Of course, the present invention is likely to have various alterations, modifications, and improvements which will readily occur to those skilled in the art. In particular, the selection of the increments-decrements to be applied to the different sections and functions are within the abilities of those skilled in the art according to the application and based on the functional indications given hereabove. Further, the selection of the sections and functions or commands to be monitored is also within the abilities of those skilled in the art. Finally, the practical implementation of the present invention by software means to execute the checking method is within the abilities of those skilled in the art and uses usual programming notions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of automatic control of execution of a program by a microprocessor, comprising:
    assigning a digital decrement to at least one function of the program and a digital increment to at least one section considered as critical as to the program execution and called by the at least one program function, or assigning a digital increment to the at least one program function and a digital decrement to the at least one section, wherein a magnitude of the digital decrement or increment assigned to the at least one section depends at least in part on how critical is the at least one section, and wherein the at least one section can be assigned more than one different digital decrements or increments depending on a function of the program that calls the at least one section;
    setting a counter to a first value;
    modifying a current value of the counter once per execution of the at least one program function before a call to the at least one critical section, by a value of the decrement or increment assigned to the at least one program function;
    when the current value of the counter is modified once per execution of the at least one program function before the call to the at least one critical section by a value of the decrement assigned to the at least one program function, modifying the current value of the counter on each correct execution of the at least one critical section by a value of the increment assigned to the at least one critical section;
    when the current value of the counter is modified once per execution of the at least one program function before the call to the at least one critical section by a value of the increment assigned to the at least one program function, modifying the current value of the counter on each correct execution of the at least one critical section by a value of the decrement assigned to the at least one critical section; and
    comparing the current value of the counter with a predetermined critical threshold.

2. The method of claim 1, wherein the comparison with the critical threshold is performed at each end of the at least one function.

3. The method of claim 1, wherein an error processing is implemented when the current value becomes smaller or greater than the critical threshold, said processing resulting in disabling of the microprocessor.

4. The method of claim 1, wherein the increase or decrease of the current value of the counter on each correct execution of the at least one critical section is limited by a second value.

5. The method of claim 4, wherein the first value of the counter is randomly selected between two limits.

6. The method of claim 5, wherein the second value is randomly selected between two limits, wherein a first limit from the limits of the second value is larger than a first limit from the limits of the first value and a second limit from the limits of the second value is larger than a second limit from the limits of the first value.

7. The method of claim 1, wherein the increase or decrease of the current value of the counter occurs at each beginning of a function.

8. The method of claim 1, wherein the increase or decrease of the current value of the counter occurs at each end of at least one section.

9. The method of claim 1, wherein the increase or decrease of the current value of the counter before a critical section call, is zero.

10. The method of claim 1, wherein the steps of increasing and decreasing the current value of the counter respectively comprise incrementing and decrementing the counter.

11. A microcontroller comprising at least one microprocessor, a rewritable non-volatile memory, a non-volatile memory, rewritable or not, for storing at least one program to be executed, and a random access memory, comprising:
    means for assigning a digital decrement to at least one function of the program and a digital increment to at least one section considered as critical as to the program execution and called by the at least one program function, or assigning a digital increment to the at least one function and a digital decrement to the at least one section, wherein a magnitude of the digital decrement or increment assigned to the at least one section depends at least in part on how critical is the at least one section, and wherein the at least one section can be assigned more than one different digital decrements or increments depending on a function of the program that calls the at least one section;
    means for setting a counter to a first value;
    means for modifying a current value of the counter once per execution of the at least one program function before a call to the at least one critical section, by a value of the decrement assigned to the at least one program function to decrease the counter once per the at least one program function or by a value of the increment assigned to the at least one program function to increase the counter once per the at least one program function;
    when the current value of the counter is modified once per execution of the at least one program function by a value of the decrement assigned to the at least one program function, means for modifying the current value of the counter on each correct execution of the at least one critical section by a value of the increment assigned to the at least one critical section;
    when the current value of the counter is modified once per execution of the at least one program function by a value of the increment assigned to the at least one program function, means for modifying the current value of the counter on each correct execution of the at least one critical section by a value of the decrement assigned to the at least one critical section; and
    means for comparing the current value of the counter with a predetermined threshold.

12. A smart card comprising the microcontroller of claim 11.

* * * * *